United States Patent [19]
Raak

[11] Patent Number: 5,672,246
[45] Date of Patent: Sep. 30, 1997

[54] INCREASING THE CAPACITY OF A RECOVERY BOILER BY WITHDRAWING SOME OF THE EXHAUST GASES FROM THE FURNACE SECTION

[75] Inventor: Keijo Raak, Varkaus, Finland

[73] Assignee: Ahlstrom Machinery Oy, Helsinki, Finland

[21] Appl. No.: 624,408
[22] PCT Filed: Aug. 10, 1995
[86] PCT No.: PCT/FI95/00424
§ 371 Date: Apr. 1, 1996
§ 102(e) Date: Apr. 1, 1996
[87] PCT Pub. No.: WO96/05366
PCT Pub. Date: Feb. 22, 1996

[30] Foreign Application Priority Data

Aug. 10, 1994 [FI] Finland ................................ 943694

[51] Int. Cl.⁶ ........................... D21C 11/12; F22B 33/02
[52] U.S. Cl. .................. 162/31; 162/30.1; 110/203; 110/238
[58] Field of Search .................. 162/29, 30.1, 31; 110/203, 204, 238; 48/197 R, 209

[56] References Cited

U.S. PATENT DOCUMENTS

| | | | |
|---|---|---|---|
| 1,719,130 | 7/1929 | Richter et al. | 423/417 |
| 4,738,835 | 4/1988 | Kiiskila | 423/200 |
| 4,739,729 | 4/1988 | Rettemeier et al. | 122/426 |
| 5,032,143 | 7/1991 | Ritakallio | 23/313 B |

FOREIGN PATENT DOCUMENTS 2140144A 11/1984 United Kingdom.

*Primary Examiner*—Donald E. Czaja
*Assistant Examiner*—Dean T. Nguyen
*Attorney, Agent, or Firm*—Nixon & Vanderhye P.C.

[57] ABSTRACT

Waste liquor from cellulose pulp processes is used in a recovery boiler to recover energy and chemicals. The recovery boiler includes a furnace section in which heat and exhaust gases are generated, and heat recovery surfaces downstream of the furnace section in a path of exhaust gas movement. Waste liquor is injected into the furnace section of the recovery boiler at a first location, and the exhaust gases produced are divided into at least first and second streams. The first stream is passed into association with the heat recovery surfaces of the recovery boiler and then discharged, while the second stream is withdrawn from the recovery boiler at a second location between the first location and the heat recovery surfaces. The withdrawn second stream is positively cooled exteriorly of the recovery boiler preferably utilizing a circulating bed cooler. An electric precipitator removes particulates from the first exhaust gas stream downstream of the heat recovery surfaces, and from the second gas stream downstream of the cooler. The second gas stream is preferably removed from the furnace section between a tertiary air inlet and a nose, and third, fourth, or even more, exhaust gas streams are preferably also removed from the furnace section between the first location and the heat recovery surfaces. Utilizing the invention the capacity of an existing recovery boiler can be inexpensively and effectively increased.

20 Claims, 1 Drawing Sheet

INCREASING THE CAPACITY OF A RECOVERY BOILER BY WITHDRAWING SOME OF THE EXHAUST GASES FROM THE FURNACE SECTION

CROSS REFERENCE TO RELATED APPLICATION

This application is a U.S. national phase of PCT/FI95/00424 filed Aug. 10, 1995.

BACKGROUND AND SUMMARY OF THE INVENTION

The present invention relates to a method of and an apparatus for recovering energy and chemicals from waste liquor in pulp processes. The invention especially relates to an increase of the capacity of a recovery boiler, i.e. kraft recovery boiler, or the like.

When combusting waste liquor in pulp processes, the aim is to separate the organic and the inorganic parts of the dry substance of the waste liquor from each other. The heat from the organic part of the dry substance is recovered and a largest possible amount of steam is produced by means of this heat. Pulping chemicals are recovered from the inorganic part of the dry substance in such a form that they can, in the subsequent stages of processing, be converted into a suitable form to be reused in the cooking process.

The kraft recovery boiler has, until now, proved to be superior for the recovery of heat and chemicals from waste liquors. The recovery boiler prior to the main heat absorbing sections can be considered as consisting of three distinct zones: a reduction zone at the bottom of the boiler, a drying zone, where liquor drops dry when falling into the reduction zone, and an oxidation zone in the upper section. The waste liquor is sprayed through liquor nozzles in the form of small drops into a furnace of the boiler. Combustion air is also introduced into the recovery boiler. Air is usually introduced at three different levels: primary air at the lower part of the furnace, secondary air above the primary air level but below the liquor nozzles, and tertiary air above the liquor nozzles to ensure complete combustion. These three air levels are conventional basic air levels in a modern recovery boiler, but also other air levels may be provided in said recovery boiler.

In the hot combustion chamber water vapor, volatile parts of the dry substance, and eventually gasifiable parts of the dry substance evaporate from the liquor drops. The gases inflame, thereby delivering heat to heat surfaces, a superheater and a boiler bank, disposed in the boiler and are discharged from the upper end of the boiler. The ash from the waste liquor drops, i.e. the inorganic substances of the waste liquor, accumulate on the bottom of the boiler, from which they are removed and brought through various stages of processing conveyed back to the cooking process.

The flue gases from the kraft recovery boiler contain a large amount of ash, mainly sodium sulfate, a portion of which flows along with the flue gases upwards in the boiler in the form of fine dust or molten drops. The salts ($Na_2SO_4$, $Na_2CO_3$, NaCl) contained in the ash melt at a relatively low temperature and become, when melting, easily adhesive and corrosive. The deposits formed by the molten ash cause risk of clogging the flue gas channels and, furthermore, cause corrosion and erosion of the heat surfaces of the boiler. The risk of clogging and corrosion increases considerably the number of shutdowns required for washing, inspection and maintenance.

A high temperature of the boiler tubes accelerates the formation of deposits and thereby the corrosion risk of the heat surfaces. Thus, the deposits affect particularly the heat surfaces of the superheater. Usually, the corrosion of the materials is reduced by controlling the temperature of the superheater surfaces.

The principal way of avoiding corrosion is, at least at the present, to choose a sufficiently low temperature and pressure for the produced steam, whereby the detrimental effects of the molten salt decrease. This means that the steam cannot be superheated to as high a temperature as desired for the production of electric power in steam turbine plants.

Attempts have been made to reduce fouling of surfaces and clogging of flue gas channels by dimensioning the convection section large enough and increasing the distance between the superheater surfaces. Larger clearances facilitate cleaning of the surfaces. These arrangements increase, however, the size of the boiler and are thus, as regards the construction costs, unfavourable.

A recovery boiler, in which the size of the superheater has had to be increased, is, as regards the heat transfer and vaporization efficiency, inferior to a corresponding coal-fired boiler. The tendency of the superheater surfaces to foul multiplies the area of the heat surfaces needed in comparison with a boiler, the flue gases of which contain only small amounts or no ash at all.

The reactions in the furnace of the recovery boiler are usually not disturbed by the amount of the black liquor to be treated. Consequently, the capacity of the recovery boiler is mainly restricted by the fouling of the heat surfaces located in the upper end of the boiler. A new recovery boiler may be required, if an essential increase in the amount of the black liquor to be treated in the recovery boiler is desired, because the introduction of additional heat surface in the existing recovery boiler is restricted from a technical and economical point of view. However, the installation of the new boiler would be an expensive solution.

It has been suggested that the recovery capacity of a pulp mill may be increased by installing a so called recovery booster without necessitating the construction of a new recovery boiler. The recovery booster is a gasification or combustion unit installed outside the recovery boiler. The idea is to bypass a portion of black liquor to this recovery booster and thus reduce the load in the recovery boiler. The recovery booster of gasification type operates with a principle of gasifying the black liquor at substoichimetric condition resulting in a flue gas having a temperature of about 800°–900° C. The flue gas is quenched with water and reduced sulfurous components are scrubbed from the cooled gas by using a weak caustic solution. The cleaned gas is then combusted in a separate gas boiler. This solution may be technically satisfactory, but it requires rather high initial investments. Additionally, the installation of this booster in an old pulp mill may be problematic because of lack of space.

The purpose of the present invention is to provide a method of increasing the production capacity of a recovery boiler, even of an existing one, for waste liquor in a technically simple and practical manner and more economically than the previous methods.

In order to achieve the above mentioned objects, the method in accordance with the present invention comprises the following steps:

(a) injecting waste liquid at a given level in the furnace of a recovery boiler and combusting waste liquor to generate flue gases;

(b) dividing the flue gases at least into two streams:

(c) introducing one of the streams through the furnace to the heat exchange surfaces subsequent to the furnace of the recovery boiler and discharging it from the boiler; and (d) withdrawing the other(s) of the gas streams from the furnace at one or more points located above the injection level for waste liquor and cooling the discharged gas.

A characterizing feature of an apparatus, a recovery boiler, in accordance with the present invention is that at least one conduit has been provided above the waste liquor injection level for the discharge of a portion of the flue gases from the furnace of a recovery boiler.

According to the present invention the capacity of the existing recovery boiler may be increased considerably. A portion of the flue gas stream is discharged from the furnace and thus the total volume of the gas stream flowing to the boiler section is reduced. The method may lend itself to any recovery boiler configuration.

As mentioned above, when the capacity of the boiler has to be increased, the bottleneck in a recovery boiler is the boiler section, and not so much the furnace. By using the present invention, the capacity of the recovery boiler may be increased in a very simple way by leading an extra amount of the generated gas stream outside the recovery boiler so that this amount does not have to flow to the heat exchange surfaces subsequent to the furnace section.

The extra gas stream is discharged from the furnace of a recovery boiler at a point where the conditions are preferably oxidative and thus the gases contain hardly any uninflammable components. Such a zone is located between the tertiary air level and a so-called nose, when air is introduced into a boiler at three different levels: primary and secondary air below the liquor nozzles and tertiary air above the nozzles to ensure complete combustion.

The portion of the flue gas that corresponds to or is slightly greater than that generated in the increase in the capacity of the recovery boiler may be separated from the total flue gas stream and withdrawn from the boiler upstream of the upper part of the boiler. Thus the gas amount flowing to the heat surfaces located downstream of the furnace may be restricted to the level prior to that increasing of the capacity or even below the level. No heat surfaces downstream of the furnace in an existing recovery boiler have to be changed because of the increased capacity.

The exhausted gas may in principle be cooled by means of any boiler structure, which is applicable for treating this kind of unclean gas. Preferably, the gas is cooled in a circulating bed reactor. The flue gas withdrawn from the furnace is brought into contact, prior to a heat exchanger, with solid particles which are separated from the cooled gas after the treatment and recirculated back to the reactor. The gas may be cooled below the solidification temperature so that the ash components contained in the gas do not stick on the heat transfer surfaces. The ash contained in the flue gases is preferably used as a circulating material. Some other inexpensive inert material, such as $Al_2O_3$, might of course be used, but it is obviously most preferable to utilize material coming from the process.

Applicable circulating bed systems are described, for example, in GB patent 2,140,144 and in U.S. Pat. Nos. 4,738,835 and 5,032,143. The use of the circulating bed cooler brings about many advantages.

The majority, about 90%, of the solid matter (ash) contained in the flue gases withdrawn form the furnace can be removed. Thus the ash content of the exhaust gas from the cooler is rather low, and the gas may be introduced along with the gas being discharged from the boiler section of the recovery boiler into an electric precipitator thereof. Usually the precipitator is able to receive the increased ash stream caused by the gas stream from the circulating bed cooler. The increase in the ash stream is so insignificant that it has usually no effect on the performance of the precipitator.

Additionally, the space required by the circulating bed cooler is small in the conditions prevailing in the recovery boiler plant. It is easy to install the cooler to the immediate vicinity of the recovery boiler, even inside the boiler room. This is because the recovery boiler plant has space in the vertical direction, but not in the latitudinal direction, and the space required by the cooler is in the horizontal plane small compared with a cooler of another type. The vertical space required by the circulating bed cooler does not prevent the installation of the cooler in a recovery boiler plant.

The circulating bed cooler may be constructed into a steam boiler or a feed water preheater. It may also serve as an air preheater, if it is reasonable from a technical point of view. The construction for a steam boiler may be made at least in the following ways:

the pressure in the steam boiler is the same as that in the recovery boiler. Consequently, it is possible to use heat recovered form the cooler for the production of electric power. This construction is a so-called water-tube boiler.

the pressure in the steam boiler is the same as that in a steam system of a pulp mill (bled steam or back-pressure, usually 10–12 bar and 2–5 bar, respectively). This construction is, as regards the construction costs, inexpensive. It is a so-called fire-tube boiler, in which a mixture of circulating material and flue gases flows through vertically disposed tubes and water to be vaporized outside the tubes.

The exhaust gas from the cooler is led through a connecting pipe to an entry duct of the precipitator or to a separate ash separator, if any.

It is the primary object of the present invention to provide for the inexpensive yet effective increase in the capaticy of a recovery boiler. This and other objects of the invention will become clear from an inspection of the detailed description of the invention and from the appended claims.

DETAILED DESCRIPTION OF THE DRAWING

Figure 1:
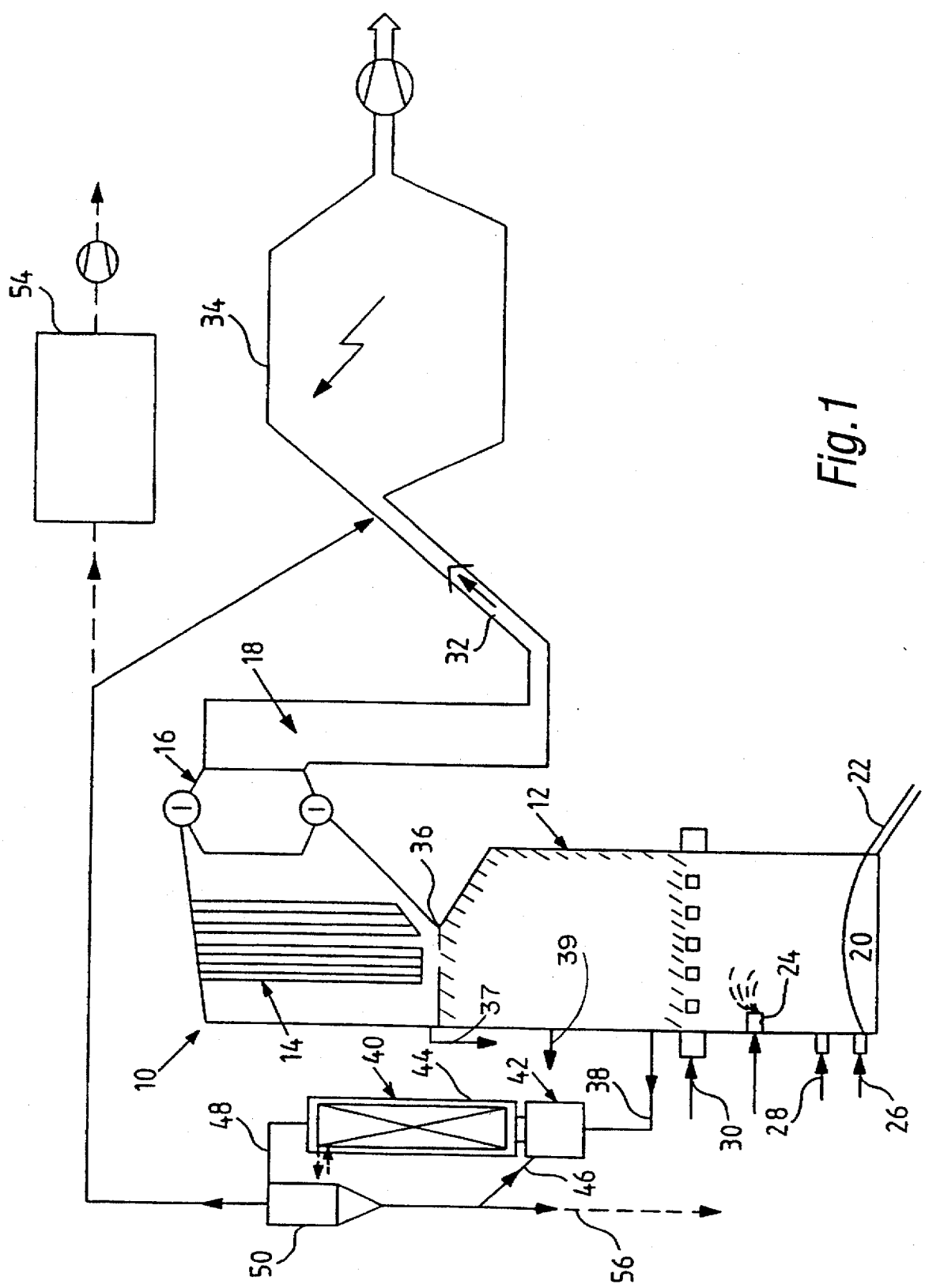
FIG. 1 is a schematic view of an exemplary recovery boiler and associated system according to the present invention, and for practicing the method according to the present invention.

A conventional recovery boiler 10 in accordance with the embodiment illustrated in FIG. 1 comprises a furnace 12 and heat exchange surfaces subsequent to the furnace: a superheater 14, a boiler bank 16 and an economizer 18. In the combustion process, a char bed of dried and partly combusted black liquor is formed at the bottom of the recovery boiler. Molten chemicals flow through the porous char bed to the bottom, from where they are transferred via melt spouts 22 to a dissolving tank (not shown in the figure). Black liquor is introduced in the boiler by spraying through nozzles 24. Combustion air is introduced from three different levels: primary air 26, secondary air 28 and tertiary air 30. There may also be other air feed levels in addition to those mentioned above.

In the recovery boiler heat is recovered from flue gases by means of vaporizing surfaces 16 (boiler bank), a water preheater 18 (economizer) and superheating surfaces 14. The flue gas that flows through the upper part of the boiler is discharged from the boiler through a line 32 to an electric precipitator 34.

According to the invention, a portion of the flue gases formed in the furnace of the recovery boiler exhausted from the furnace at a point located above the injection level 24 for the liquor. This zone is situated between the waste liquor injection level 24 and a nose 36, preferably above a tertiary air level 30. Thus the gas does likely not contain any significant amounts of uninflammable components. Accordingly, the amount of the black liquor to be fed to the recovery boiler (i.e. the capacity of the recovery boiler) may be increased, since part of the generated flue gas bypasses the upper end of the boiler. The capacity of the boiler may thus be increased for at least 10–30%.

Gas may also be discharged through the section above the nose 36, before the gases flow to the superheaters 14, as indicated schematically at 37 in FIG. 1.

In a system according to the present invention gas may be discharged through one or more points (e.g. at the level of conduit 38), which are at the same level in the boiler wall. Alternatively, discharge points may be located at different vertical levels, as indicated schematically by lines 38 and 39 in FIG. 1. For example, the most preferred arrangement depends on the lay-out of the boiler plant.

The exhausted flue gas is introduced from line 38 into a cooling unit 40, which comprises a mixing chamber 42 and a heat exchanger 44. Such a cooling unit is described, for example, in the above mentioned GB and US patents.

The flue gases are mixed with a cooled circulating material from a line 46, which material preferably contains the ash in the gas. The temperature of the mixture is decreased below the solidification temperature of the ash components. After the mixing and the decrease of temperature the mixture flows through a heat exchanger 44, whereby it is cooled. Since the temperature is below the solidification point, the ash contained in the gas does not stick on the heat surfaces. The heat exchanger may be constructed as a steam boiler, a feed water preheater or an air preheater, as described above.

After the heat exchanger, the gas is tangentially led through a line 48 to a cyclone 50, in which the solid circulating material will be separated from the gas. The purified gas in introduced through a line 52 to the electric precipitator 34 or to a separate ash separator 54. Part of the solid material (ash) separated in the cyclone 50 is returned to the mixing chamber 42 by means of the return pipe 46. The extra ash which cannot be used as a circulating material is led through a line 56 to the existing ash system of the recovery boiler.

Part of the purified cooled gas may be circulated to the mixing chamber in order to intensify the cooling.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method of treating waste liquors from cellulose pulping processes to recover energy and chemicals therefrom, using a recovery boiler having a furnace section in which exhaust gases are generated and which move away from the furnace section in a path, and heat recovery surfaces located downstream of the furnace section in the path of exhaust gas movement from the furnace section, said method comprising the steps of:

(a) injecting waste liquor into the furnace section of the recovery boiler at a first location, and combusting the waste liquor in the furnace to generate heat and exhaust gases;

(b) dividing the exhaust gases into first and second streams;

(c) passing the first stream into association with the heat recovery surfaces of the recovery boiler, and then discharging the first stream from the recovery boiler; and (d) withdrawing the second stream from the recovery boiler at a second location between the first location and the heat recovery surfaces.

2. A method as recited in claim 1 comprising the further step (e) of introducing tertiary air into the furnace at a third location between the first location and the heat recovery surfaces; and wherein step (d) is practiced to withdraw the second stream from the recovery boiler at the second location between the third location and the heat recovery surfaces.

3. A method as recited in claim 2 wherein the recovery boiler has a nose between the furnace and the heat recovery surfaces; and wherein stop (d) is practiced to withdraw the second stream from the recovery boiler at the second location between the third location and the nose.

4. A method as recited in claim 3 comprising the further stop (f) of withdrawing a third stream of exhaust gases from the recovery boiler between the nose and the heat recovery surfaces.

5. A method as recited in claim 4 comprising the further step (g) of withdrawing a fourth stream of exhaust gases from the recovery boiler between the nose and the second location.

6. A method as recited in claim 1 comprising the further stop (e) of removing particulates from the first gas stream after it is exhausted from the recovery boiler.

7. A method as recited in claim 6 comprising the further stop (f) of positively cooling the second gas stream exteriorly of the recovery boiler.

8. A method as recited in claim 7 wherein step (f) is practiced in a circulating bed cooler in which particles are mixed with the second gas stream; comprising the further step (g) of removing particles from the second gas stream after the practice of stop (f) to produce a particle-reduced second stream.

9. A method as recited in claim 8 comprising the further step (h) of combining the particle-reduced second stream with the first gas stream after the first gas stream is exhausted from the recovery boiler, but prior to the practice of step (e), so that particles are simultaneously removed from both the first stream and the particle-reduced second stream during the practice of stop (e).

10. A method as recited in claim 1 comprising the further step (e) of cooling the second gas stream exteriorly of the recovery boiler using a circulating bed cooler.

11. A method as recited in claim 10 wherein the circulating bed cooler has a mixing section, a heat exchange section, and a particle removing section; and wherein step (e) is practiced by mixing the second gas stream with particles in the mixing section, then passing the mixed particles and gas through the heat exchange section to recover heat therefrom, and then passing the particles and gas to the particle removing section to remove particles therefrom.

12. A method as recited in claim 11 wherein stop (e) is further practiced to introduce feed water into heat exchange relationship with the gases in the heat exchange section to simultaneously cool the gases and preheat the feed water.

13. A method as recited in claim 11 wherein the recovery boiler further comprises an ash disposal system; and wherein stop (e) is further practiced by mixing the second gas stream with particles from the particle removing section in the mixing section, the particles comprising ash from the exhaust gas second stream; and comprising the further stop (f) of passing some of the removed ash particles from the particle removing section to the ash system for the recovery boiler.

14. A method as recited in claim 10 wherein the cooler is operated as a boiler.

15. A recovery boiler for recovering heat and chemicals from waste liquor from cellulose pulp processes, comprising:

- a furnace section for combusting waste liquor from cellulose pulp processes to produce heat and exhaust gases, and an upper end of said recovery boiler above said furnace section;
- an injector for injecting waste liquor from cellulose pulp processes into said furnace section at a first location;
- a plurality of heat recovery surfaces located above said furnace section and in said upper end of said recovery boiler, exhaust gases passing from said furnace section to said heat recovery surfaces; and
- a first conduit for withdrawing some of the exhaust gases from said furnace section of said recovery boiler, said conduit disposed at a second location between said first location and said heat recovery surfaces.

16. A recovery boiler as recited in claim 15 further comprising a circulating bed cooler disposed exteriorly of said recovery boiler and connected to said first conduit for cooling exhaust gases removed from said furnace section by said first conduit.

17. A recovery boiler as recited in claim 16 wherein said circulating bed cooler has a mixing section in which particles are mixed with exhaust gases from said first conduit, a heat exchange section connected to said mixing section and for cooling exhaust gases mixed with particles, and a particle removing section connected to said heat exchange section for removing particles from the exhaust gases after cooling in said heat exchange section.

18. A recovery boiler as recited in claim 17 wherein said particle removing section comprises a cyclone separator, and wherein some particles removed from the exhaust gases by said cyclone separator are passed to said mixing section.

19. A recovery boiler as recited in claim 15 further comprising a tertiary air inlet to said furnace section between said first location and said heat recovery surfaces.

20. A recovery boiler as recited in claim 15 further comprising a second conduit for removing some of the exhaust gases from said furnace section at a third location, said third location above said second location and below said heat recovery surfaces.

* * * * *